(12) United States Patent
Mereddy

(10) Patent No.: US 12,706,824 B2
(45) Date of Patent: Aug. 11, 2026

(54) MEASURING PERFORMANCE OF A SERVICE PROVIDER NETWORK

(71) Applicant: Charter Communications Operating, LLC, St. Louis, MO (US)

(72) Inventor: Sandeep Reddy Mereddy, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 69 days.

(21) Appl. No.: 18/462,074

(22) Filed: Sep. 6, 2023

(65) Prior Publication Data

US 2025/0080441 A1 Mar. 6, 2025

(51) Int. Cl.
*H04L 43/0864* (2022.01)
*H04L 41/16* (2022.01)
*H04L 43/045* (2022.01)

(52) U.S. Cl.
CPC .......... *H04L 43/0864* (2013.01); *H04L 41/16* (2013.01); *H04L 43/045* (2013.01)

(58) Field of Classification Search
CPC .... H04L 43/0864; H04L 41/16; H04L 43/045
USPC .......................................................... 709/224
See application file for complete search history.

(56) References Cited

U.S. PATENT DOCUMENTS 9,503,384 B1 * 11/2016 Oliveira .............. H04L 43/0882
2003/0233445 A1 * 12/2003 Levy ................... H04L 43/0888 709/224
2004/0064577 A1 * 4/2004 Dahlin ...................... H04L 9/40 709/224
2011/0239226 A1 * 9/2011 Placanica ................ H04L 69/28 719/313
2016/0026683 A1 * 1/2016 Sah ..................... G06F 16/2453 707/770
2023/0300671 A1 * 9/2023 Jian ......................... H04L 47/11 370/229
2024/0235973 A1 * 7/2024 Cohen ................. H04L 41/5032

FOREIGN PATENT DOCUMENTS

KR 101914391 B1 * 11/2018

* cited by examiner

*Primary Examiner* — Suraj M Joshi
*Assistant Examiner* — Ayele F. Woldemariam
(74) *Attorney, Agent, or Firm* — Dority & Manning, P.A.

(57) ABSTRACT

A computing device receives information associated with a server computing device and a plurality of client computing devices, each client computing device communicatively coupled to a router device. The computing device receives, for each respective client computing device of the plurality of client computing devices, TCP packet capture data associated with the respective client computing device. The computing device accesses an expected average packet round trip time (APRTT) for a client computing device from among the plurality of client computing devices. The computing device performs a comparison of a real-time APRTT for the client computing device and the expected APRTT for the client computing device. The computing device generates user interface imagery based on the comparison.

15 Claims, 5 Drawing Sheets

MEASURING PERFORMANCE OF A SERVICE PROVIDER NETWORK

BACKGROUND

Internet service providers provide internet access and other services to customers via a network of routers over a geographic area.

SUMMARY

The examples disclosed herein measure performance of a service provider network. In particular, the performance, such as latency, of an internet service provider network can be periodically measured to identify locations in the network, such as routers, which are experiencing a latency problem.

In one example, a method for measuring performance of a service provider network is provided. The method includes receiving, by a computing device, information associated with a server computing device and a plurality of client computing devices, each client computing device communicatively coupled to a router device. The method further includes receiving, by the computing device, for each respective client computing device of the plurality of client computing devices, TCP packet capture data associated with the respective client computing device. The method further includes accessing, by the computing device, an expected average packet round trip time (APRTT) for a client computing device from among the plurality of client computing devices. The method further includes performing, by the computing device, a comparison of a real-time APRTT for the client computing device and the expected APRTT for the client computing device. The method further includes generating, by the computing device, user interface imagery based on the comparison.

In another example, a computing device for measuring performance of a service provider network is provided. The computing device includes a memory and a processor device coupled to the memory. The processor device is to receive information associated with a server computing device and a plurality of client computing devices, each client computing device communicatively coupled to a router device. The processor device is further to receive, for each respective client computing device of the plurality of client computing devices, TCP packet capture data associated with the respective client computing device. The processor device is further to access an expected average packet round trip time (APRTT) for a client computing device from among the plurality of client computing devices. The processor device is further to perform a comparison of a real-time APRTT for the client computing device and the expected APRTT for the client computing device. The processor device is further to generate user interface imagery based on the comparison.

In another example, a non-transitory computer-readable storage medium for measuring performance of a service provider network is provided. The non-transitory computer-readable storage medium includes computer-executable instructions to cause a processor device to receive information associated with a server computing device and a plurality of client computing devices, each client computing device communicatively coupled to a router device. The instructions further cause the processor device to receive, for each respective client computing device of the plurality of client computing devices, TCP packet capture data associated with the respective client computing device. The instructions further cause the processor device to access an expected average packet round trip time (APRTT) for a client computing device from among the plurality of client computing devices. The instructions further cause the processor device to perform a comparison of a real-time APRTT for the client computing device and the expected APRTT for the client computing device. The instructions further cause the processor device to generate user interface imagery based on the comparison.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
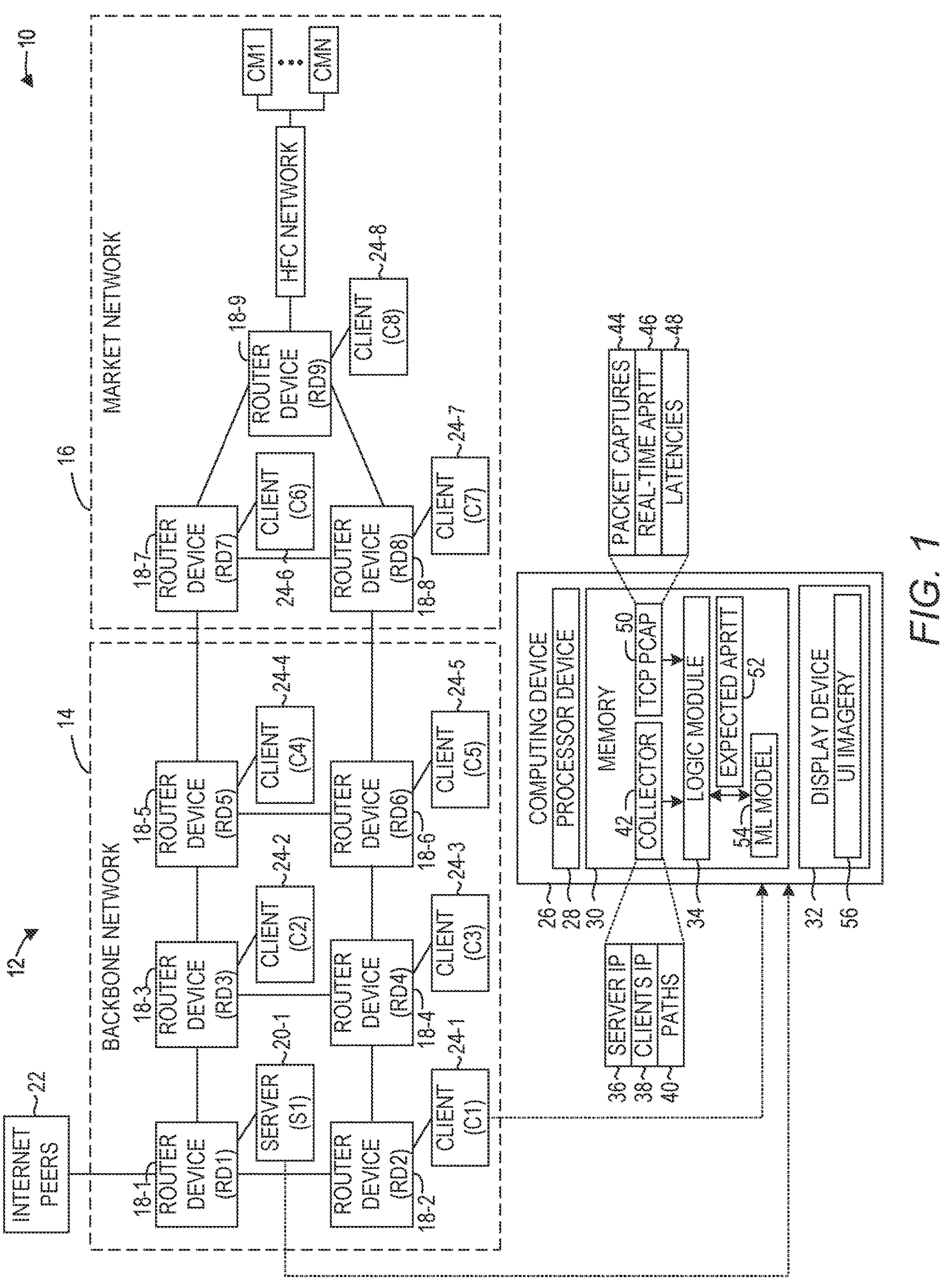
FIG. 1 is a block diagram of an environment in which examples of measuring performance of a service provider network may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Internet service providers provide internet access and other services to customers via a network of routers over a geographic area. Specifically, the Transmissions Control Protocol (TCP) can provide services (e.g., voice, video, data) to customers in the internet service provider (ISP)

network. TCP performance (e.g., latency) is important in providing services to customers without delay or degradation in service.

The examples disclosed herein measure performance of a service provider network. In particular, the performance, such as latency, of an internet service provider network can be periodically measured to identify locations in the network, such as routers, which are experiencing a latency problem. End-to-end TCP performance latency on an ISP can be detected for troubleshooting TCP issues, such as when there is an event triggering TCP re-transmission due to drops on a service provider transit router, and the latency can be identified at the specific router with the latency problem.

A server can be communicatively coupled to each peering router in an ISP network, which connects the ISP to internet peers to connect the ISP to the internet or another network, and a client can be communicatively coupled to each router in the ISP network. Scripts running on the clients can form periodic TCP sessions with the server and initiate an application, such as a file transfer, collect packet captures of TCP performance data, such as latency, pass the data to a machine-learned model, and the machine-learned model can provide feedback of any anomalies, such as latency. The feedback can be provided to a core logic module that can generate a graphical user interface associated with the anomalies to be displayed on a display device.

FIG. 1 is a block diagram of an environment 10 in which examples of measuring performance of a service provider network may be practiced. The environment 10 includes a service provider network 12 that is organized into a backbone network 14 and a market network 16. While for purposes of illustration only one backbone network 14 and one market network 16 are illustrated, in practice the service provider network 12 may have multiple backbone networks 14 and multiple market networks 16.

The backbone network 14 can include a plurality of routers 18-1-18-6 that provide packets to a plurality of markets, such as the market network 16. The routers 18-1-18-6 may be long distances from one another. The backbone network 14 may be coupled to a plurality of routers 18-7-18-9 that are in the market network 16. The market network 16 can provide services to customers, such as voice, video, and data services, via an HFC (hybrid fiber-coax) network.

Each of the routers 18-1-18-6 in the backbone network 14 and each of the routers 18-7-18-9 in the market network 16 may be coupled to a server computing device or a client computing device. A server 20-1 may be coupled to a router in the backbone network 14 (e.g., router 18-1). The router 18-1 that is coupled to the server 20-1 may be a peering router that connects the service provider network 12 to one or more internet peers 22. Although only one server 20-1 is illustrated, in some examples, there may be more than one server computing device, with each server computing device coupled to a router in the backbone network 14 that each connects the respective server to an internet peer. The routers 18-2-18-9 may each be coupled to a client computing device of a plurality of client computing devices 24-1-24-8. Programming scripts running on the client computing devices 24-1-24-8 form periodic TCP sessions with the server 20-1 coupled to the router 18-1 and can initiate an application, such as a file transfer, in the service provider network 12. For instance, the server 20-1 can download a file and send the file to one or more of the client computing devices 24-1-24-8.

The service provider network 12 includes a computing device 26, which includes a processor device 28, a memory 30, and a display device 32. The computing device 26 includes a logic module 34 that may implement some or all of the processing disclosed herein. It is to be understood that the computing device 26 in some examples may include constituent elements in addition to those illustrated in FIG. 1.

The logic module 34 can receive information associated with the server 20-1, which is communicatively coupled to the router 18-1, and information associated with the client computing devices 24-1-24-8, which are each communicatively coupled to a router from among the routers 18-2-18-9. For instance, the logic module 34 can use a periodic traceroute to receive the information associated with the server 20-1 and the client computing devices 24-1-24-8 by tracing the route of an IP packet through the service provider network 12 from the server 20-1 to each of the client computing devices 24-1-24-8 and/or from each of the client computing devices 24-1-24-8 to the server 20-1. The information associated with the server 20-1 and the client computing devices 24-1-24-8 may include one or more of an IP address 36 of the server 20-1, an IP address 38 of each of the client computing devices 24-1-24-8, or paths 40 between the server 20-1 and each client computing device 24-1-24-8. For example, the paths 40 may include the path from the server 20-1 to the client computing device 24-1 via the routers, which results in the path of the server 20-1 to the router 18-1 to the router 18-2 to the client computing device 24-1. In some examples, the computing device 26 may include a collector 42 that collects the information associated with the server 20-1 and the client computing devices 24-1-24-8 and sends the information to the logic module 34. Scripts running on the computing device 26 (e.g., the logic module 34, the collector 42) may periodically or continuously capture the information associated with the server 20-1 and the client computing devices 24-1-24-8, such as by performing a traceroute. In some examples, a user may provide at least some of the information associated with the server 20-1 and the client computing devices 24-1-24-8, such as the IP addresses of the server 20-1 and the client computing devices 24-1-24-8, to the computing device 26 (e.g., the logic module 34, the collector 42).

The logic module 34 can receive TCP packet capture data associated with each of the client computing devices 24-1-24-8. The TCP packet capture data associated with each of the client computing devices 24-1-24-8 may include one or more of packet capture data 44, such as packet captures, for the respective client computing device, a real-time average packet round trip time (APRTT) 46 for the respective client computing device, or a latency 48 in a path between the server 20-1 and the respective client computing device. The real-time APRTT 46 for the respective client computing device can be determined by collecting round trip times (RTTs) for packets sent from the server 20-1 to the respective client computing device and averaging the RTTs. The logic module 34 can scrub the TCP packet capture data associated with each of the client computing devices 24-1-24-8 to correlate related data for each of the paths 40 and each of the client computing devices 24-1-24-8 with a respective packet capture. In some examples, the computing device 26 may include a TCP packet capture (TCAP) module 50 that collects the TCP packet capture data associated with each of the client computing devices 24-1-24-8. The TCAP module 50 can send the TCP packet capture data associated with each of the client computing devices 24-1-24-8 to the logic module 34 or the logic module 34 can access the TCAP module 50 to obtain the TCP packet capture data associated with each of the client computing devices 24-1-24-8.

The logic module 34 can access an expected average packet round trip time (APRTT) 52 for a client computing device from among the client computing devices 24-1-24-8. The logic module 34 may send the information associated with the server 20-1 and the client computing devices 24-1-24-8 and the TCP packet capture data associated with each of the client computing devices 24-1-24-8 periodically to a machine-learned model (MLM) 54 trained on prior APRTTs for the client computing devices 24-1-24-8 for learning the expected APRTTs for the client computing devices 24-1-24-8. The prior APRTTs that the MLM 54 is trained on may be received by the MLM 54 from the logic module 34 which can send the real-time APRTTs for the client computing devices 24-1-24-8 to the MLM 54 periodically. For instance, the logic module 34 can send the real-time APRTT 46 for the client computing device, as well as the other client computing devices, to the MLM 54, which can be further trained on the real-time APRTT 46 in order to learn the expected APRTT 52 for the client computing device and for the other client computing devices. In some implementations, the logic module 34 can determine the paths 40 between the server 20-1 and each client computing device 24-1-24-8 and send the paths 40 to the MLM 54. The paths 40 may be determined by a traceroute from the server 20-1 to each client computing device 24-1-24-8 or based on the information associated with the server 20-1 and the associated client computing devices 24-1 24-8, as non-limiting examples.

The MLM 54 can use the information associated with the server 20-1 and the client computing devices 24-1-24-8 (e.g., the IP address 36 of the server 20-1, the IP address 38 of each of the client computing devices 24-1-24-8, and/or the paths 40 between the server 20-1 and each client computing device 24-1-24-8) and the TCP packet capture data associated with each of the client computing devices 24-1-24-8 (e.g., the packet capture data 44, the real-time APRTT 46 for the respective client computing device, and/or the latency 48 in a path between the server 20-1 and the respective client computing device) to determine the expected APRTT 52 for the client computing device from among the client computing devices 24-1-24-8, as well as the other client computing devices. For instance, prediction algorithms of the MLM 54 can predict the expected APRTT 52 for the client computing device based on the prior APRTTs that trained the MLM 54, the information associated with the server 20-1 and the client computing devices 24-1-24-8, and the TCP packet capture data associated with each of the client computing devices 24-1-24-8. The MLM 54 can then send the expected APRTT 52 for the client computing device from among the client computing devices 24-1-24-8 to the logic module 34 and the logic module 34 can receive the expected APRTT 52.

The logic module 34 can perform a comparison of the real-time APRTT 46 for the client computing device and the expected APRTT 52 for the client computing device. Based on the comparison, the logic module 34 can generate user interface imagery 56 to be displayed on the display device 32. For instance, when the real-time APRTT 46 for the client computing device is less than or equal to the expected APRTT 52 for the client computing device, then there is no latency in the client computing device path. When the real-time APRTT 46 for the client computing device is greater than the expected APRTT 52, then there is latency in the client computing device path and the user interface imagery 56 that is generated can display the latency. For example, the path of the server 20-1 to the router 18-1 to the router 18-2 to the client computing device 24-1 may have a latency when the real-time APRTT 46 for the client computing device 24-1 is greater than the expected APRTT 52 for the client computing device 24-1, which indicates that the router 18-1 and/or the router 18-2 has a latency problem. In some implementations, the computing device 26 can perform a corrective action, such as shutting down or isolating the router where there is a latency in the path.

In some implementations, the logic module 34 can access the expected APRTT 52 for each of the client computing devices 24-1-24-8 and perform the comparison of the real-time APRTT 46 for each of the client computing devices 24-1-24-8 and the expected APRTT 52 for each of the client computing devices 24-1-24-8. The logic module 34 may send the information associated with the server 20-1 and the client computing devices 24-1-24-8 and the TCP packet capture data associated with each of the client computing devices 24-1-24-8 to the machine-learned model 54, and receive the expected APRTT 52 for each of the client computing devices 24-1-24-8. For example, the logic module 34 may access the expected APRTT 52 for client computing device 24-1 and compare the real-time APRTT 46 of client computing device 24-1 to the expected APRTT 52 for client computing device 24-1. The logic module 34 may access the expected APRTT 52 for client computing device 24-2 and compare the real-time APRTT 46 of client computing device 24-2 to the expected APRTT 52 for client computing device 24-2, and so on for all of the client computing devices 24-1-24-8.

It is to be understood that, because the logic module 34 is a component of the computing device 26, functionality implemented by the logic module 34 may be attributed to the computing device 26 generally. Moreover, in examples where the logic module 34 comprises software instructions that program the processor device 28 to carry out functionality discussed herein, functionality implemented by the logic module 34 may be attributed herein to the processor device 28. It is to be further understood that while, for purposes of illustration only, the logic module 34 is depicted as a single component, the functionality implemented by the logic module 34 may be implemented in any number of components, and the examples discussed herein are not limited to any particular number of components.

Figure 2:
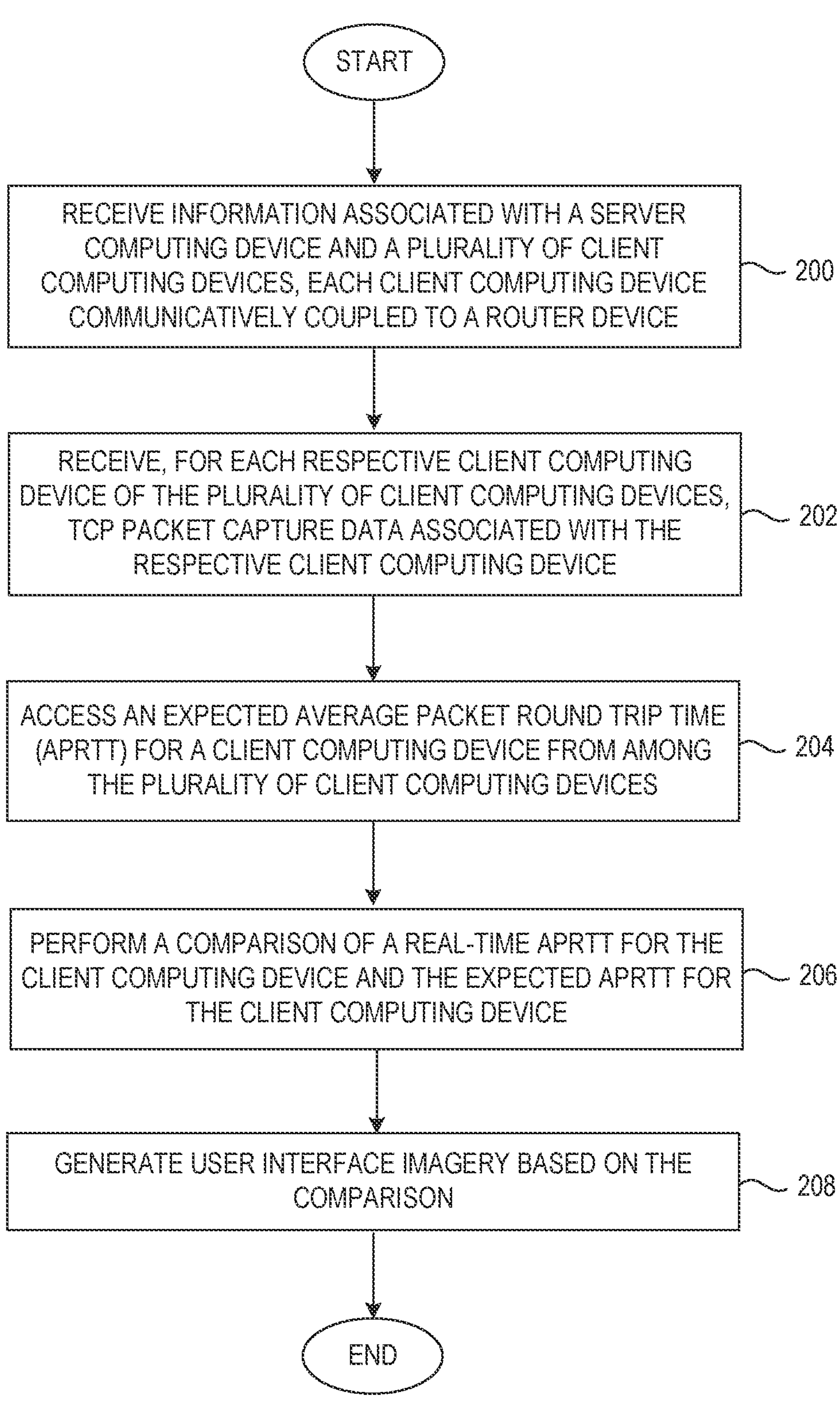
FIG. 2 is a flowchart illustrating operations for measuring performance of a service provider network, according to one example.

FIG. 2 is a flowchart illustrating operations for measuring performance of a service provider network, according to one example. Elements of FIG. 1 are referenced in describing FIG. 2 for the sake of clarity. In FIG. 2, operations begin with a processor device of a computing device, such as the processor device 28 of the computing device 26 of FIG. 1, the processor device 28 to receive information associated with a server computing device and a plurality of client computing devices, each client computing device communicatively coupled to a router device (block 200). The processor device 28 is further to receive, for each respective client computing device of the plurality of client computing devices, TCP packet capture data associated with the respective client computing device (block 202). The processor device 28 is further to access an expected average packet round trip time (APRTT) for a client computing device from among the plurality of client computing devices (block 204). The processor device 28 is further to perform a comparison of a real-time APRTT for the client computing device and the expected APRTT for the client computing device (block 206). The processor device 28 is further to generate user interface imagery based on the comparison (block 208).

Figure 3A:
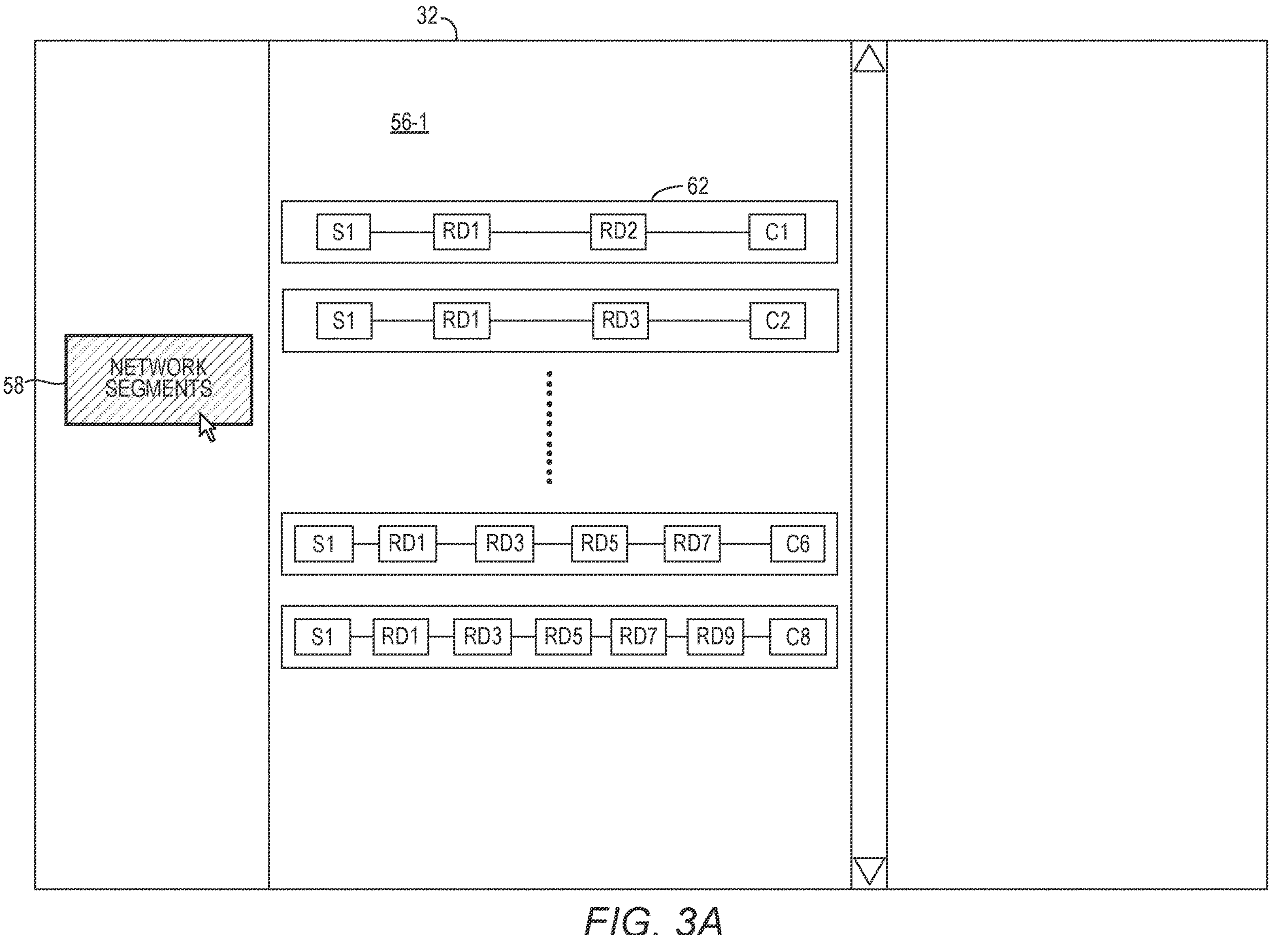
FIGS. 3A-3B are diagrams illustrating a user interface for measuring performance of a service provider network, according to one example.
Figure 3B:
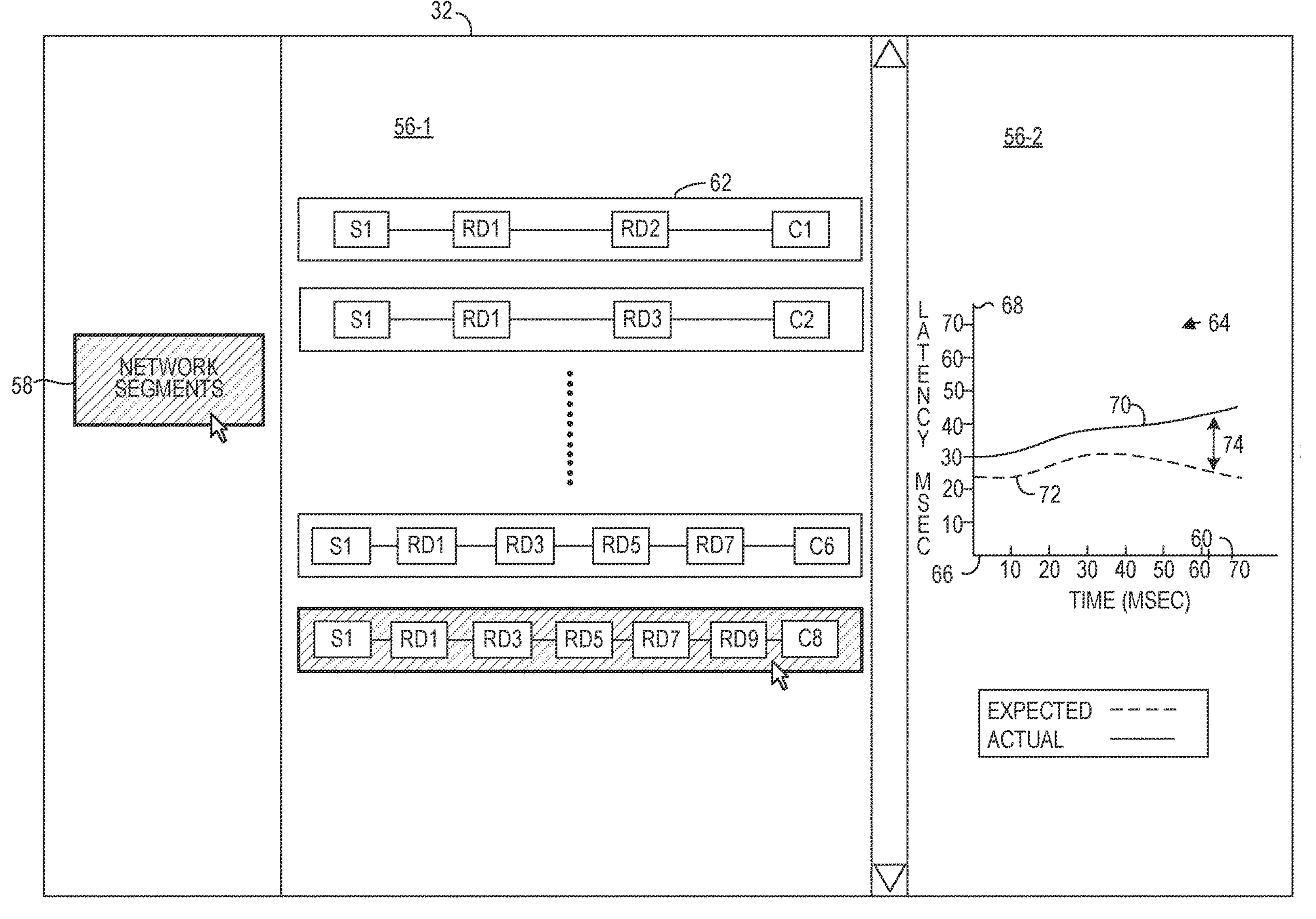

FIGS. 3A-3B are diagrams illustrating a user interface for measuring performance of a service provider network, according to one example. Elements of FIG. 1 are referenced in describing FIGS. 3A-3B for the sake of clarity. In the example of FIG. 3A, the logic module 34 generates user interface imagery 56-1 that includes a selectable control 58 that can be displayed on the display device 32. A user input selection of the control 58 can present the user interface imagery 56-1 on the display device 32. In the example of FIG. 3B, logic module 34 generates user interface imagery 56-2 that can be displayed on the display device 32.

The logic module 34 can determine, based on the comparison of the real-time APRTT 46 for the client computing device from among the client computing devices 24-1-24-8 and the expected APRTT 52 for the client computing device, that the real-time APRTT 46 is greater than the expected APRTT 52 over a predetermined amount of time 60. The logic module 34 can generate the user interface imagery 56-1, which can include a path 62 between the server 20-1 and the client computing device and the routers from among the routers 18-1-18-9 that are between the server 20-1 and the client computing device. The user interface imagery 56-1 can include an image of each of the paths 40 between the server 20-1 and each of the client computing devices 24-1-24-8, or the user interface imagery 56-1 can include an image of each of the paths 40 when the real-time APRTT 46 is greater than the expected APRTT 52 for the respective client computing device. For example, the path of the server 20-1 to the router 18-1 to the router 18-2 to the client computing device 24-1 may be displayed as a path 62 in the user interface imagery 56-1. The router or routers that are causing the latency in the path 62 may be colored or in bold type in some examples to allow a user to easily see the problem router in the path 62.

The logic module 34 can generate user interface imagery 56-2 that includes a graph 64 that displays that the real-time APRTT 46 is greater than the expected APRTT 52 for the client computing device path. The graph 64 may comprise an x-axis that displays time 66, including the predetermined amount of time 60, and a y-axis of the latency 68 in the path 62 between the server 20-1 and the client computing device. The graph 64 can include a line 70 for the real-time APRTT 46 and a line 72 for the expected APRTT 52, and the line 70 can be above the line 72 to indicate that the real-time APRTT 46 is greater than the expected APRTT 52 for the client computing device path. The distance 74 between the line 70 and the line 72 at the predetermined time 60 can show the difference between the real-time APRTT 46 and the expected APRTT 52 at that time for the client computing device path. The greater the distance 74 between the line 70 and the line 72 at a point in time 66 indicates the larger the latency issue in the path 62. When the distance 74 between the line 70 and the line 72 at a point in time 66 is decreasing, the latency issue is improving and there may no longer be a latency issue in the path 62 once the distance 74 is less than a predetermined amount or when the line 72 is at or above the line 70.

A user input selection of a path 62 displayed in the user interface imagery 56-1 can cause the display device 32 to additionally display the user interface imagery 56-2 on the display device 32 to the right of the user interface imagery 56-1 to show the graph 64 for the path 62 in response to the user input selection of the path 62. For example, the path of the server 20-1 to router 18-1, router 18-3, router 18-5, router 18-7, and router 18-9 to the client computing device 24-8 may displayed as a path 62 in the user interface imagery 56-1, a user can select the path 62, and the user interface imagery 56-2 of the graph 64 showing that the real-time APRTT 46 (i.e., line 70) is greater than the expected APRTT 52 (i.e., line 72) for the client computing device 24-8 path can be displayed on the display device 32. The user can then determine the router in the path that caused the latency based on the path 62 and the graph 64.

Figure 4:
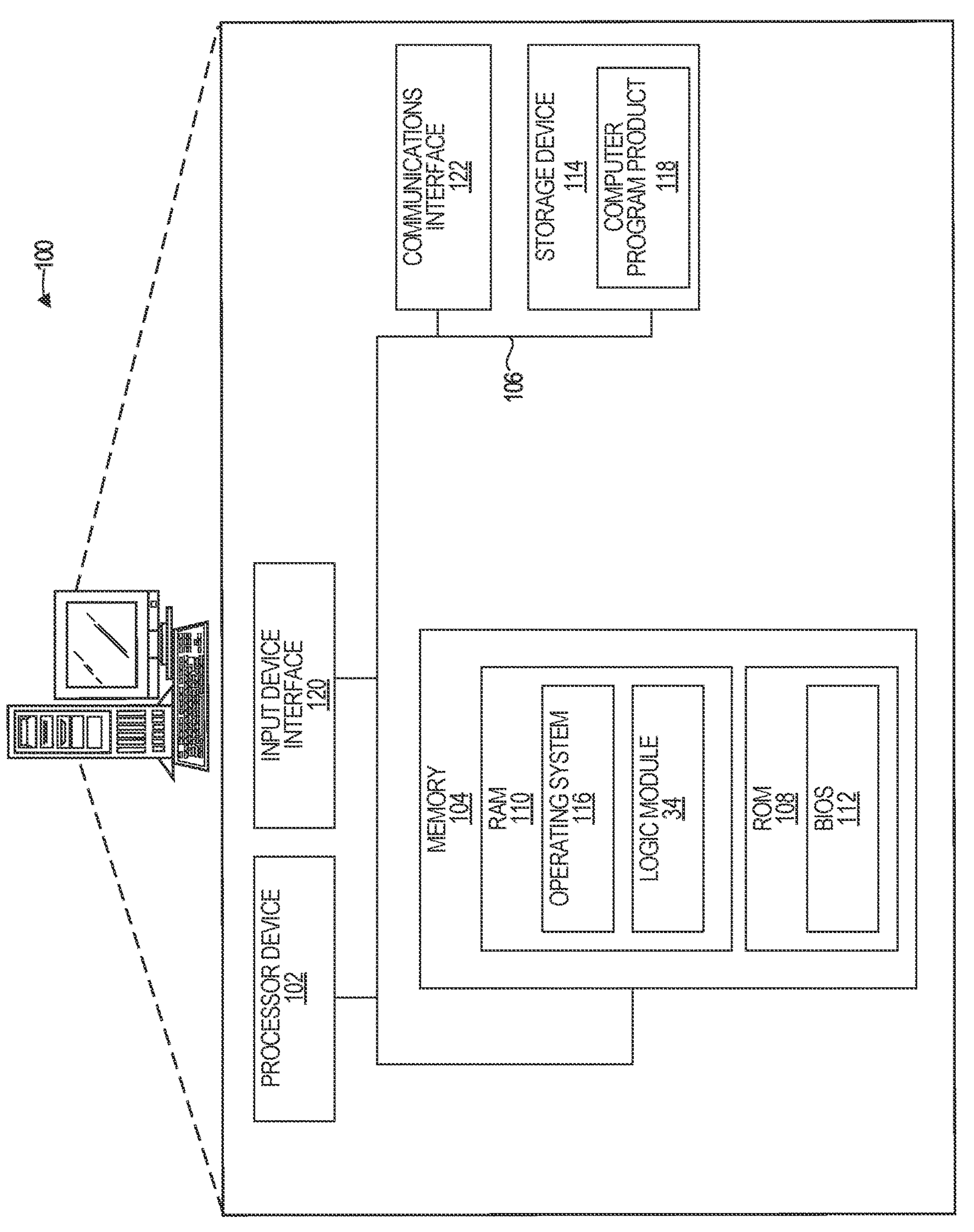
FIG. 4 is a block diagram of a computing device suitable for implementing examples, according to one example.

FIG. 4 is a block diagram of a computing device 100, such as the computing device 26 of FIG. 1, suitable for implementing examples according to one example. The computing device 100 may comprise any computing or electronic device capable of including firmware, hardware, and/or executing software instructions to implement the functionality described herein. The computing device 100 includes a processor device 102, such as the processor device 28, a system memory 104, such as the memory 30, and a system bus 106. The system bus 106 provides an interface for system components including, but not limited to, the system memory 104 and the processor device 102. The processor device 102 can be any commercially available or proprietary processor.

The system bus 106 may be any of several types of bus structures that may further interconnect to a memory bus (with or without a memory controller), a peripheral bus, and/or a local bus using any of a variety of commercially available bus architectures. The system memory 104 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)). A basic input/output system (BIOS) 112 may be stored in the non-volatile memory 108 and can include the basic routines that help to transfer information between elements within the computing device 100. The volatile memory 110 may also include a high-speed RAM, such as static RAM, for caching data.

The computing device 100 may further include or be coupled to a non-transitory computer-readable storage medium such as a storage device 114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

A number of modules can be stored in the storage device 114 and in the volatile memory 110, including an operating system 116 and one or more program modules, such as the logic module 34, which may implement the functionality described herein in whole or in part. All or a portion of the examples may be implemented as a computer program product 118 stored on a transitory or non-transitory computer-usable or computer-readable storage medium, such as the storage device 114, which includes complex programming instructions, such as complex computer-readable program code, to cause the processor device 102 to carry out the steps described herein. Thus, the computer-readable program code can comprise software instructions for implementing the functionality of the examples described herein when executed on the processor device 102. The processor device 102, in conjunction with the logic module 34 in the volatile memory 110, may serve as a controller, or control system, for the computing device 100 that is to implement the functionality described herein.

An operator, such as a user, may also be able to enter one or more configuration commands through a keyboard (not illustrated), a pointing device such as a mouse (not illustrated), or a touch-sensitive surface such as a display device (not illustrated). Such input devices may be connected to the processor device 102 through an input device interface 120 that is coupled to the system bus 106 but can be connected by other interfaces such as a parallel port, an Institute of Electrical and Electronic Engineers (IEEE) 1394 serial port, a Universal Serial Bus (USB) port, an IR interface, and the like. The computing device 100 may also include a communications interface 122 suitable for communicating with the network as appropriate or desired. The computing device 100 may also include a video port (not illustrated) configured to interface with the display device (not illustrated), to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:

receiving, by a computing device, information associated with a server computing device and a plurality of client computing devices, each client computing device directly coupled to a corresponding different router device of a plurality of router devices, the information comprising path information that identifies a set of routers between the server computing device and a first client computing device of the plurality of client computing devices that route a packet communicated between the server computing device and the first client computing device;

determining, by the computing device, a real-time average packet round trip time (APRTT) for the first client computing device;

accessing, by the computing device, an expected APRTT for the first client computing device;

performing, by the computing device, a comparison of the real-time APRTT for the first client computing device and the expected APRTT for the first client computing device;

based on the comparison and the path information, generating, by the computing device, user interface imagery comprising a first image that depicts the server computing device, the set of routers, and the first client computing device;

displaying, by the computing device, the user interface imagery on a display device;

receiving, by the computing device, user input selecting the first image;

in response to the user input, generating a second image comprising information that displays, for the path, that the real-time APRTT for the first client computing device is greater than the expected APRTT for the first client computing device; and presenting the user interface imagery on the display device, wherein the user interface imagery comprises the first image and the second image.

2. The method of claim 1, wherein accessing the expected APRTT comprises:

sending, to a machine-learned model (MLM) trained on prior APRTTs for the plurality of client computing devices, the information associated with the server computing device and the plurality of client computing devices and TCP packet capture data associated with each respective client computing device; and receiving, from the MLM, the expected APRTT for the first client computing device.

3. The method of claim 2, wherein the expected APRTT for the first client computing device is based on the information associated with the server computing device and the client computing device and TCP packet capture data associated with the first client computing device.

4. The method of claim 2, further comprising:

sending, to the MLM, the real-time APRTT for the first client computing device, wherein the MLM is further trained on the real-time APRTT.

5. The method of claim 1, further comprising:

accessing an expected APRTT for each respective client computing device of the plurality of client computing devices; and performing, for each respective client computing device of the plurality of client computing devices, a comparison of a real-time APRTT for the respective client computing device and the expected APRTT for the respective client computing device.

6. The method of claim 5, wherein the user interface imagery comprises, for each respective client computing device of the plurality of client computing devices, an image of a path between the server computing device and the respective client computing device, the image identifying, for each path, one or more routers between the server computing device and the respective client computing device.

7. The method of claim 1, wherein the information that displays, for the path, that the real-time APRTT for the first client computing device is greater than the expected APRTT for the first client computing device comprises a graph comprising an x-axis of time that includes a predetermined amount of time, and a y-axis of latency, wherein the real-time APRTT for the first client computing device is indicated by a first line on the graph, the expected APRTT for the first client computing device is indicated by a second line on the graph, and the first line is above the second line.

8. The method of claim 1, wherein the server computing device is communicatively coupled to a peering router that connects an internet service provider to one or more internet peers.

9. The method of claim 1, wherein the information associated with the server computing device and the plurality of client computing devices comprises one or more of an Internet Protocol (IP) address of the server computing device, an IP address of each client computing device of the plurality of client computing devices, or one or more paths between the server computing device and each client computing device.

10. The method of claim 1, further comprising:

determining, for each respective client computing device of the plurality of client computing devices, one or more paths between the respective client computing device, the plurality of client computing devices, and the server computing device; and sending, to a machine-learned model trained on prior APRTTs for the plurality of client computing devices, the one or more paths between the respective client computing device, the plurality of client computing devices, and the server computing device.

11. A computing device, comprising:

a memory;

a processor device coupled to the memory, the processor device to:

receive information associated with a server computing device and a plurality of client computing devices, each client computing device directly coupled to a corresponding different router device of a plurality of router devices, the information comprising path information that identifies a set of routers between the server computing device and a first client computing device of the plurality of client computing devices that route a packet communicated between the server computing device and the first client computing device;

determine a real-time average packet round trip time (APRTT) for the first client computing device;

access an expected APRTT for the first client computing device;

perform a comparison of the real-time APRTT for the first client computing device and the expected APRTT for the first client computing device;

based on the comparison and the path information, generate user interface imagery comprising a first image that depicts the server computing device, the set of routers, and the first client computing device;

display the user interface imagery on a display device;

receive user input selecting the first image;

in response to the user input, generate a second image comprising information that displays, for the path, that the real-time APRTT for the first client computing device is greater than the expected APRTT for the first client computing device; and present the user interface imagery on the display device, wherein the user interface imagery comprises the first image and the second image.

12. The computing device of claim 11, wherein, to access the expected APRTT, the processor device is further to:

send, to a MLM trained on prior APRTTs for the plurality of client computing devices, the information associated with the server computing device and the plurality of client computing devices and TCP packet capture data associated with each respective client computing device; and receive, from the MLM, the expected APRTT for the first client computing device.

13. The computing device of claim 11, wherein the processor device is further to:

access an expected APRTT for each respective client computing device of the plurality of client computing devices; and perform, for each respective client computing device of the plurality of client computing devices, a comparison of a real-time APRTT for the respective client computing device and the expected APRTT for the respective client computing device.

14. A non-transitory computer-readable storage medium that includes computer-executable instructions that, when executed, cause one or more processor devices to:

receive information associated with a server computing device and a plurality of client computing devices, each client computing device directly coupled to a corresponding different router device of a plurality of router devices, the information comprising path information that identifies a set of routers between the server computing device and a first client computing device of the plurality of client computing devices that route a packet communicated between the server computing device and the first client computing device;

determine a real-time average packet round trip time (APRTT) for the first client computing device;

access an expected APRTT for the first client computing device;

perform a comparison of the real-time APRTT for the first client computing device and the expected APRTT for the first client computing device;

based on the comparison and the path information, generate user interface imagery comprising a first image that depicts the server computing device, the set of routers, and the first client computing device;

display the user interface imagery on a display device;

receive user input selecting the first image;

in response to the user input, generate a second image comprising information that displays, for the path, that the real-time APRTT for the first client computing device is greater than the expected APRTT for the first client computing device; and present the user interface imagery on the display device, wherein the user interface imagery comprises the first image and the second image.

15. The non-transitory computer-readable storage medium of claim 14, wherein, to access the expected APRTT, the instructions are further to cause the processor device to:

send, to a MLM trained on prior APRTTs for the plurality of client computing devices, the information associated with the server computing device and the plurality of client computing devices and TCP packet capture data associated with each respective client computing device; and receive, from the MLM, the expected APRTT for the first client computing device.

* * * * *